US012648003B2

(12) United States Patent
Shi et al.

(10) Patent No.: US 12,648,003 B2
(45) Date of Patent: Jun. 2, 2026

(54) METHODS AND SYSTEMS FOR MULTI-CHANNEL SCHEDULING ON ONE OR MORE CELLS

(71) Applicant: ZTE Corporation, Shenzhen (CN)

(72) Inventors: Jing Shi, Shenzhen (CN); Peng Hao, Shenzhen (CN); Xingguang Wei, Shenzhen (CN); Xing Liu, Shenzhen (CN); Kai Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 329 days.

(21) Appl. No.: 18/522,003

(22) Filed: Nov. 28, 2023

(65) Prior Publication Data

US 2024/0098756 A1      Mar. 21, 2024

Related U.S. Application Data

(63) Continuation of application No. PCT/CN2021/140350, filed on Dec. 22, 2021.

(51) Int. Cl.
 *H04W 72/232*     (2023.01)
 *H04L 1/1812*     (2023.01)
 *H04W 72/1273*    (2023.01)

(52) U.S. Cl.
 CPC ......... *H04W 72/232* (2023.01); *H04L 1/1812* (2013.01); *H04W 72/1273* (2013.01)

(58) Field of Classification Search
 CPC ... H04L 1/1614; H04L 1/1812; H04L 1/1861; H04L 1/1864; H04W 72/1273; H04W 72/232
 See application file for complete search history.

(56) References Cited

U.S. PATENT DOCUMENTS

| | | | | |
|---|---|---|---|---|
| 2014/0219233 A1* | 8/2014 | Ahn | ................... | H04W 72/1273 |
| | | | | 370/329 |
| 2014/0362797 A1* | 12/2014 | Aiba | ..................... | H04W 72/20 |
| | | | | 370/329 |
| 2017/0257871 A1* | 9/2017 | Yu | ........................ | H04W 72/542 |
| 2017/0366305 A1* | 12/2017 | Hwang | ................. | H04L 5/0055 |
| 2018/0241510 A1* | 8/2018 | Shen | ........................ | H04L 1/18 |
| 2022/0029758 A1* | 1/2022 | Bae | ........................ | H04W 72/23 |
| 2022/0183038 A1* | 6/2022 | Saber | ................... | H04L 1/1854 |

(Continued)

FOREIGN PATENT DOCUMENTS

| | | |
|---|---|---|
| WO | 2020/194514 | 10/2020 |
| WO | 2021/097656 | 5/2021 |

(Continued)

OTHER PUBLICATIONS

U.S. Appl. No. 63/254,853 (Year: 2021).*

(Continued)

*Primary Examiner* — Dung B Huynh

(74) *Attorney, Agent, or Firm* — Perkins Coie LLP

(57) ABSTRACT

Methods and systems for techniques for determining control information in wireless networks are disclosed. In an implementation, a method of wireless communication includes receiving, by a wireless device, a first configuration of multiple traffic channels on multiple cells scheduled by a downlink control information (DCI) and a second configuration of multiple traffic channels on one cell scheduled by the DCI, and receiving the multiple traffic channels scheduled by the DCI.

20 Claims, 6 Drawing Sheets

(56) References Cited

U.S. PATENT DOCUMENTS

| | | | | |
|---|---|---|---|---|
| 2022/0346104 A1* | 10/2022 | Yi | H04L 1/1854 |
| 2023/0031360 A1* | 2/2023 | Zhang | H04L 1/1854 |
| 2023/0045655 A1* | 2/2023 | Ji | H04L 5/0094 |
| 2023/0092206 A1* | 3/2023 | Bae | H04W 72/23 |
| | | | 370/329 |
| 2023/0113205 A1* | 4/2023 | Kim | H04L 1/1861 |
| | | | 455/522 |
| 2023/0116687 A1* | 4/2023 | Zewail | H04L 5/0044 |
| | | | 370/329 |
| 2023/0129120 A1* | 4/2023 | MolavianJazi | H04L 1/1887 |
| | | | 370/329 |
| 2023/0139269 A1* | 5/2023 | MolavianJazi | H04L 5/0044 |
| | | | 370/329 |
| 2023/0217456 A1* | 7/2023 | Yi | H04L 5/001 |
| | | | 370/329 |
| 2023/0232411 A1* | 7/2023 | Zhang | H04L 5/0053 |
| 2023/0254857 A1* | 8/2023 | Moon | H04B 17/24 |
| | | | 370/329 |
| 2023/0291509 A1* | 9/2023 | Baldemair | H04L 1/1861 |
| 2023/0345482 A1* | 10/2023 | Ye | H04W 72/1273 |
| 2023/0403717 A1* | 12/2023 | Rastegardoost | H04L 5/0055 |
| 2024/0023098 A1* | 1/2024 | Wang | H04W 72/1273 |
| 2024/0032031 A1* | 1/2024 | Yi | H04W 72/1273 |
| 2024/0032032 A1* | 1/2024 | Ye | H04W 72/23 |
| 2024/0057108 A1* | 2/2024 | Yi | H04L 1/1854 |
| 2024/0072975 A1* | 2/2024 | Rastegardoost | H04W 72/20 |
| 2024/0098756 A1* | 3/2024 | Shi | H04W 72/232 |
| 2024/0137952 A1* | 4/2024 | Li | H04W 72/232 |
| 2024/0187136 A1* | 6/2024 | Nishio | H04L 1/08 |
| 2024/0243855 A1* | 7/2024 | Bhamri | H04L 1/1887 |
| 2024/0340116 A1* | 10/2024 | Wang | H04L 1/1854 |
| 2024/0405950 A1* | 12/2024 | Guo | H04L 1/08 |
| 2025/0113357 A1* | 4/2025 | Zhang | H04L 1/1896 |
| 2025/0300770 A1* | 9/2025 | Wang | H04L 1/1812 |
| 2025/0374265 A1* | 12/2025 | MolavianJazi | H04W 72/0453 |

FOREIGN PATENT DOCUMENTS

| | | |
|---|---|---|
| WO | 2021/147091 | 7/2021 |
| WO | 2021/161060 | 8/2021 |

OTHER PUBLICATIONS

International Search Report and Written Opinion for PCT/CN2021/140350, filed Dec. 22, 2021, Report dated Sep. 6, 2022, 9 pages.

Huawei, et al. "HARQ enhancements in NR unlicensed" 3GPP TSG RAN WG1 Meeting #97 R1-1906046, Reno, USA, May 13-17, 2019.

Extended European Search Report for co-Pending EP Appl. No. 21 968 520.3 Report dated Apr. 10, 2024, 12 pages.

Huawei "Feature lead summary#3 of HARQ enhancements for NR-U" 3GPP TSG RAN WG1 Meeting #99 Reno, USA, Nov. 18-22, 2019, R1-1913561, 41 pages.

Lenovo "Feature lead summary#1 on multi-cell scheduling via a single DCI" 3GPP TSG RAN WG1 Meeting #103-e, e-Meeting, Oct. 26-Nov. 13, 2020, R1-2009559, 27 pages.

EPO, Intention to Grant for European Application No. 21 968 520.3, mailed on Dec. 5, 2025, 9 pages.

* cited by examiner

Figure 5:
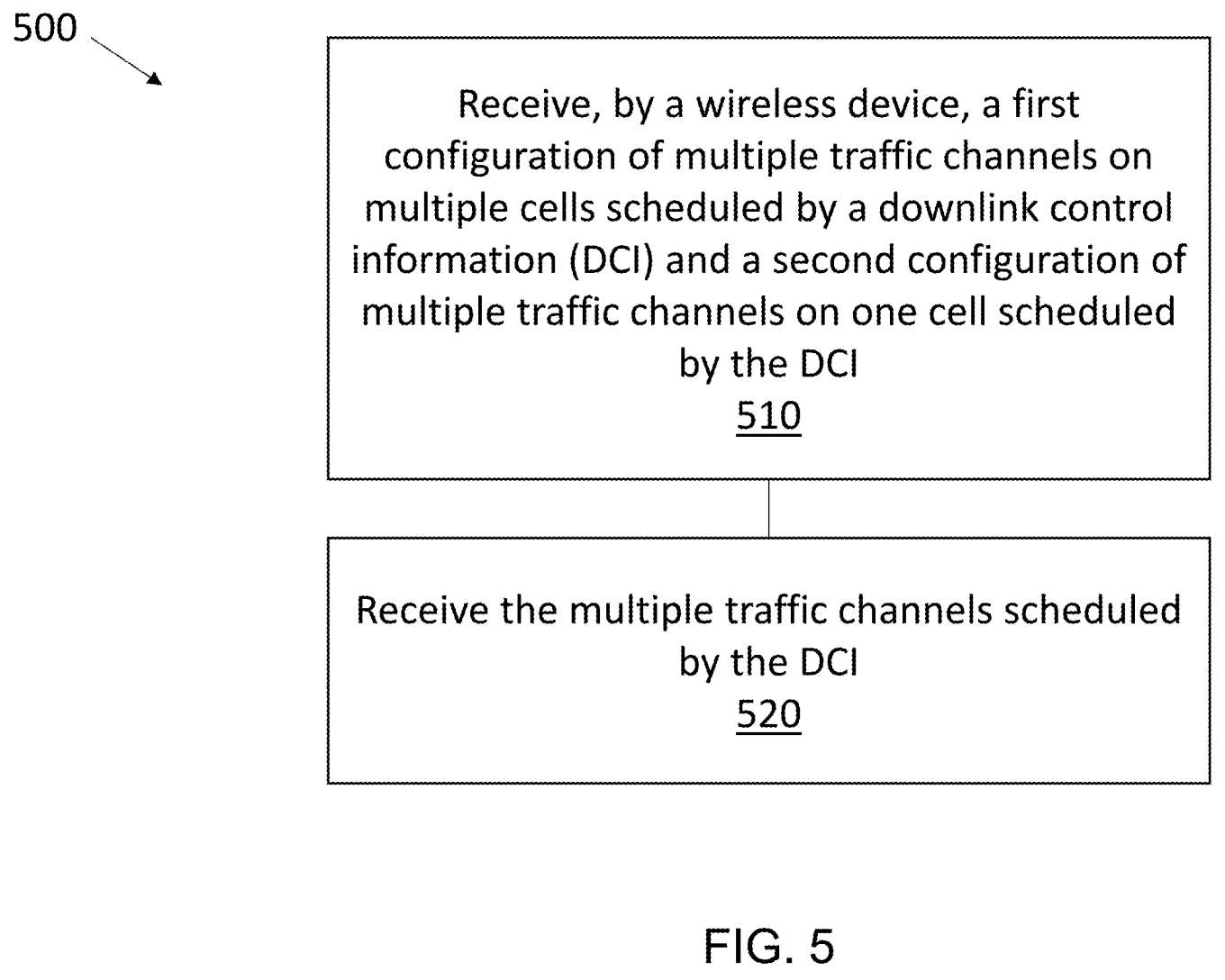

500

Receive, by a wireless device, a first configuration of multiple traffic channels on multiple cells scheduled by a downlink control information (DCI) and a second configuration of multiple traffic channels on one cell scheduled by the DCI
510

Receive the multiple traffic channels scheduled by the DCI
520

Configure, by a network device, multiple traffic channels on one or more cells, the multiple traffic channels on multiple cells being scheduled by a downlink control information (DCI), the multiple traffic channels on one cell of the multiple cells being scheduled by the DCI

610

Transmit the multiple traffic channels scheduled by the DCI

620

METHODS AND SYSTEMS FOR MULTI-CHANNEL SCHEDULING ON ONE OR MORE CELLS

CROSS-REFERENCE TO RELATED APPLICATION

This application is a continuation and claims priority to International Application No. PCT/CN2021/140350, filed on Dec. 22, 2021, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for multi-channel scheduling in wireless networks.

In one aspect, a method of data communication is disclosed. The method includes receiving, by a wireless device, a first configuration of multiple traffic channels on multiple cells scheduled by a downlink control information (DCI) and a second configuration of multiple traffic channels on one cell scheduled by the DCI, and receiving the multiple traffic channels scheduled by the DCI.

In another aspect, a method of data communication is disclosed. The method includes configuring, by a network device, multiple traffic channels on one or more cells, the multiple traffic channels on multiple cells being scheduled by a downlink control information (DCI), the multiple traffic channels on one cell of the multiple cells being scheduled by the DCI, and transmitting the multiple traffic channels scheduled by the DCI.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

BRIEF DESCRIPTION OF THE DRAWING

FIG. 5 shows an example of a process for wireless communication based on some example embodiments of the disclosed technology.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

Figure 1:
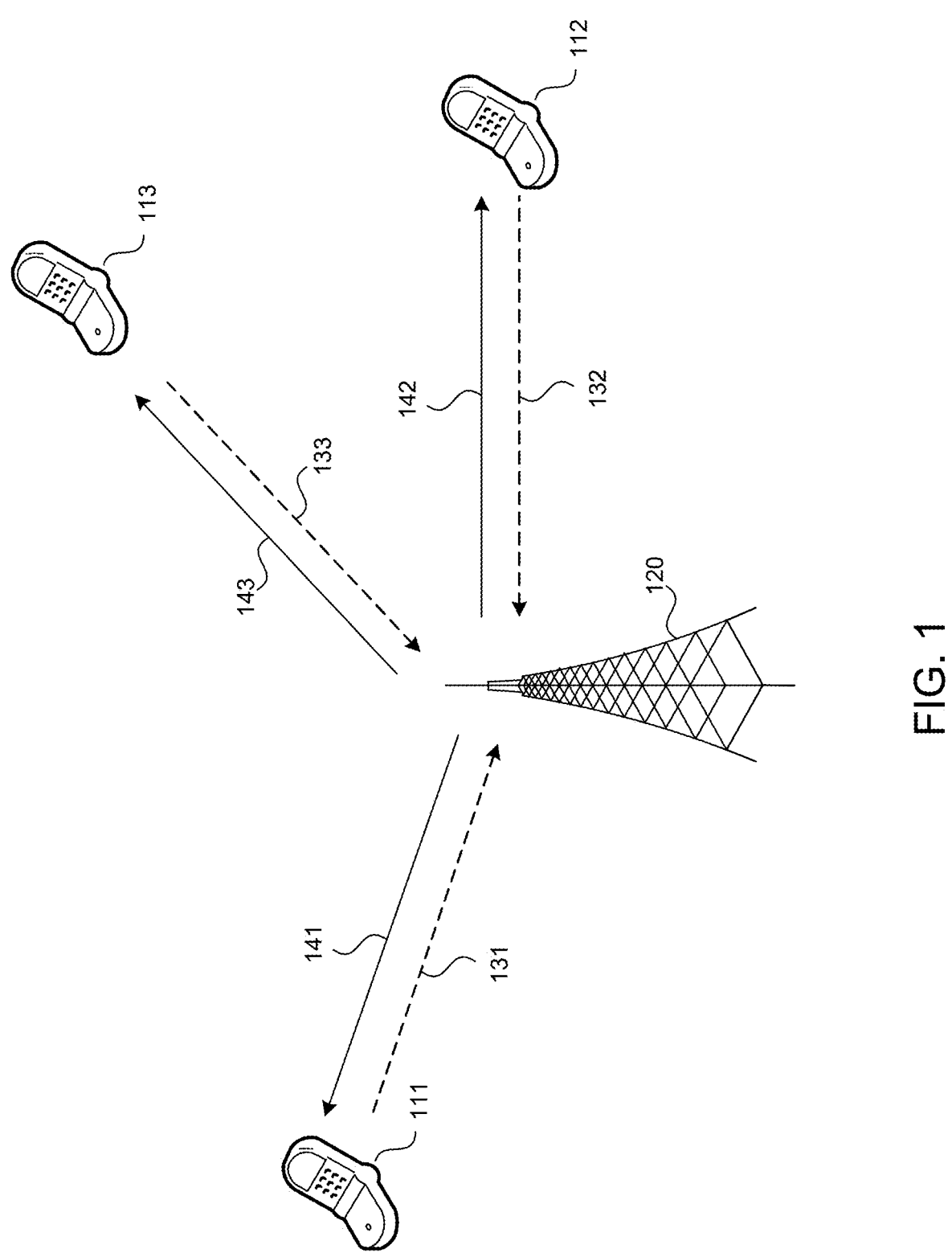
FIG. 1 shows an example of a wireless communication system based on some example embodiments of the disclosed technology.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
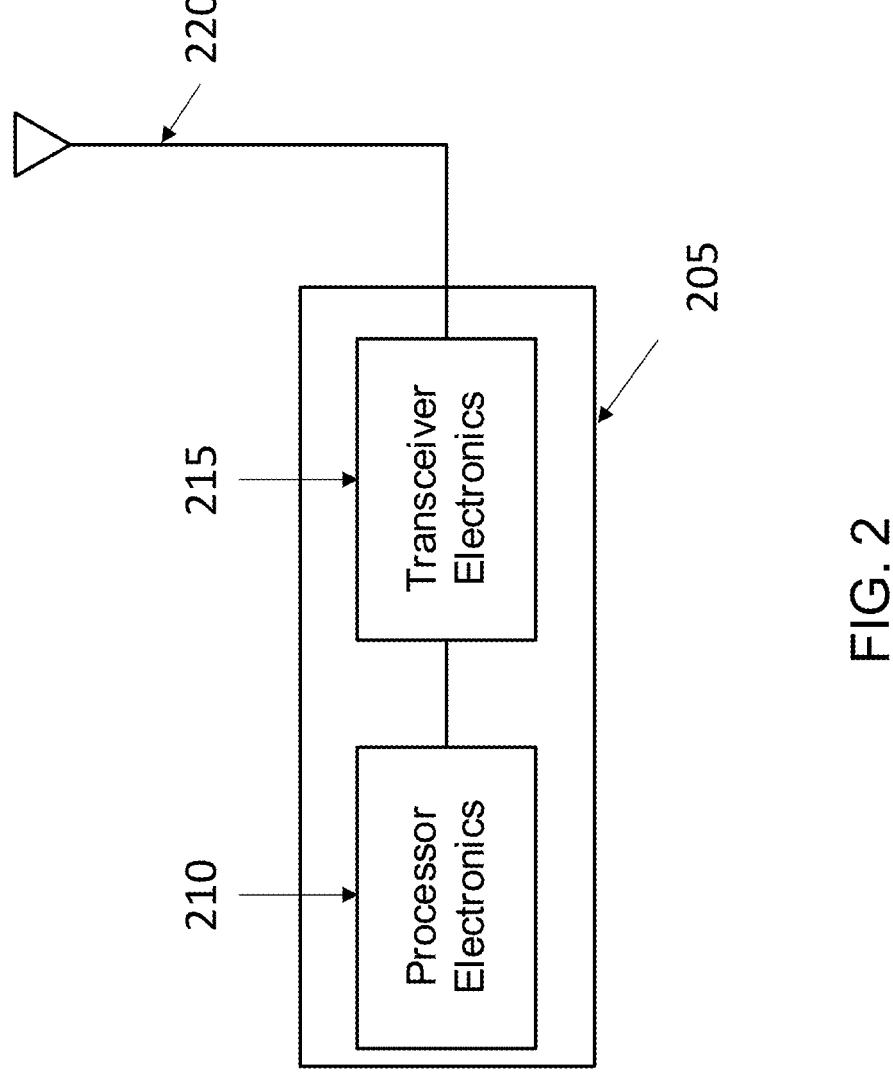
FIG. 2 is a block diagram representation of a portion of an apparatus based on some embodiments of the disclosed technology.

FIG. 2 is a block diagram representation of a portion of an apparatus based on some embodiments of the disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

The 4th Generation mobile communication technology (4G) Long-Term Evolution (LTE) or LTE-Advance (LTE-A) and the 5th Generation mobile communication technology (5G) face more and more demands. Based on the current development trend, 4G and 5G systems are developing supports on features of enhanced mobile broadband (eMBB), ultra-reliable low-latency communication (URLLC), and massive machine-type communication (mMTC). In addition, Carrier Aggregation (CA) can be used in both the 4G and 5G communication systems.

In the current carrier aggregation (CA) techniques, scheduling mechanism only allows scheduling of single-cell physical uplink shared channel (PUSCH)/physical downlink shared channel (PDSCH) per a scheduling DCI. With more available scattered spectrum bands, the need of simultaneous scheduling of multiple cells is expected to be increasing. To reduce the control overhead, it is beneficial to extend from single-cell scheduling to multi-cell PUSCH/PDSCH scheduling with a single scheduling downlink control information (DCI).

When multi-cell PUSCH/PDSCH scheduling with a single scheduling DCI is introduced, since multi-TTI (transmission time interval) scheduling on one cell is also used to reduce control overhead, how and whether multi-cell scheduling and multi-TTI scheduling can be applied together should be determined.

Embodiment 1

In the current standard, there are Type 1 codebook and Type 2 codebook, which can be configured by higher layer signaling. For Type 1 codebook, since it has no relation with the dynamic scheduling DCI for each PDSCH, the Type 1 codebook is the same as a legacy codebook if multi-cell scheduling is introduced.

For Type 2 codebook, the multi-cell scheduling DCI design may have a separate or shared indication for each field. (1) If all the fields related to Hybrid Automatic Repeat Request-Acknowledgement (HARQ-ACK) feedback are separately indicated, for example, a counter downlink assignment index (C-DAI) and a total downlink assignment index (T-DAI) are separately indicated, optionally also separate indication for K1 and PRI, then the type 2 codebook construction is the same as a legacy codebook construction. (2) If the indication of C/T-DAI is shared, the codebook for multi-cell PDSCH can be constructed as another sub-codebook similar to multi-PDSCH on one cell, where the C-DAI/T-DAI is counted per downlink control information (DCI), and HARQ-ACK feedback messages for multi-PDSCH are in a single PUCCH, the indication of k1 is shared and based on the last PDSCH.

The disclosed technology can be implemented in some embodiments to determine how to handle multi-cell scheduling together in a case that multi-PDSCH on one cell is configured.

In some embodiments, the disclosed technology can be implemented to determine the bit size and order of codebook when multi-PDSCH (multi-TTI) on one cell and multi-cell scheduling are both configured.

In the case of (1), the cell configured with multi-TTI scheduling can support multi-cell scheduling, because the scheduling information of each cell is indicated separately. Therefore, another sub-codebook for the multi-TTI PDSCH is constructed, and that sub-codebook is the same as a legacy codebook.

In the case of (2), the indication of C/T-DAI are shared, both multi-cell and multi-TTI scheduling are constructed as in one sub-codebook. The bit size and order of the sub-codebook are determined as will be discussed below.

In some implementations of the disclosed technology, HARQ-ACK bits size for each DAI can be determined as follows: where the maximum configured number of cell number is N1, and the maximum configured number of PDSCHs is N2 for multi-PDSCH DCI across serving cells (N3), then the bits size for each DAI is $N1+N2*N3-N3$. Here, only one transport block (TB) is assumed for each PDSCH. If two codewords or code block group (CBG) is configured or scheduled, then multi bits for each cell are determined accordingly.

In an example where multi-cell scheduling with configured maximum cells number is N1=4, the maximum configured number of PDSCHs are N2=4 for one cell in N1 cells and N2=2 for one cell in N1 cells, that is N2=4 for multi-PDSCH DCI across N3=2 cells. The bits size for each DAI is $4+4*2-2=10$ bits.

In some implementations of the disclosed technology, HARQ-ACK bits order for the sub-codebook (CB) can be determined as follows:

Method 1: bits order for the sub-CB is for the multi-cell with single PDSCH by cell index first, and then for the multi-TTI PDSCH by cell index and Start and Length Indicator (SLIV) order for each cell.

Figure 3:
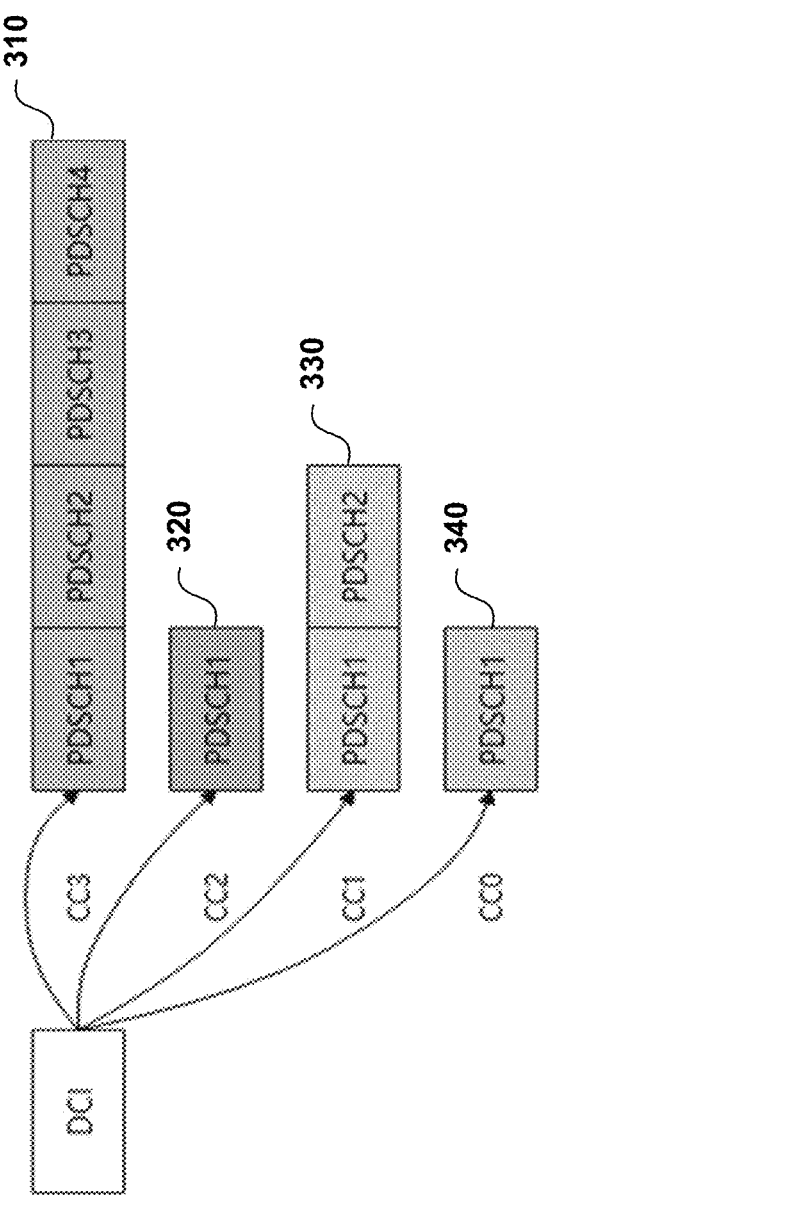
FIG. 3 shows an example of multi-cell scheduling based on some example embodiments of the disclosed technology.

FIG. 3 shows an example of multi-cell scheduling based on some example embodiments of the disclosed technology. FIG. 3 shows four cells 310, 320, 330, 340 (CC0, CC1, CC2, CC3) as an example.

Referring to FIG. 3, for example, the maximum cell number for the multi-cell scheduling is configured as 4 cells, where cell #1 is configured with maximum 2 PDSCHs for the multi-TTI scheduling and cell #3 is configured with maximum 4 PDSCHs for the multi-TTI scheduling. In this case, N1=4, N2=4 and N3=2. In the multi-cell and multi-TTI scheduling DCI, the C-DAI increases by one 1, then the bits size for this DAI counting is 10 bits, and the bits order is for the single PDSCH scheduling in the multi-cell scheduling first (for CC0 and CC2), and then for the multi-TTI scheduling in the multi-cell scheduling (for CC1 and CC3). If only one TB for each PDSCH and ACK is feedback, then the bits order for FIG. 3 is "1111001111." Here, the first "1" from the left (from the most significant bit) corresponds to CC0, the second "1" from the left corresponds to CC2, the third and fourth "1" from the left correspond to CC1, and the first to fourth "1" from the right (from the least significant bit) correspond to CC3.

Method 2: bits order for the sub-CB is for the multi-TTI PDSCH by cell index first, and SLIV order for each cell, and then for the multi-cell with single PDSCH by cell index.

Referring to FIG. 3, for example, the maximum cell number for the multi-cell scheduling is configured as 4 cells, where cell #1 is configured with maximum 2 PDSCHs for the multi-TTI scheduling and cell #3 is configured with maximum 4 PDSCHs for the multi-TTI scheduling. In this case, N1=4, N2=4 and N3=2. In the multi-cell and multi-TTI scheduling DCI, the C-DAI increases by one 1, then the bits size for this DAI counting is 10 bits, and the bits order is for the multi-TTI scheduling in the multi-cell scheduling first (for CC1 and CC3), then for the single PDSCH scheduling in the multi-cell scheduling (for CC0 and CC2). If only one TB for each PDSCH and ACK is feedback, then the bits order for FIG. 3 is "1100111111." Here, the first and second "1" from the left (from the most significant bit) correspond to CC1, the fifth to eighth "1" from the left correspond to CC3, the second "1" from the right (from the least significant bit) corresponds to CC0, and the first "1" from the right corresponds to CC2.

Method 3: bits order for the sub-CB is determined only by cell index and SLIV order for each cell if any.

Referring to FIG. 3, for example, the maximum cell number for the multi-cell scheduling is configured as 4 cells, where cell #1 is configured with maximum 2 PDSCHs for the multi-TTI scheduling and cell #3 is configured with maximum 4 PDSCHs for the multi-TTI scheduling. In this case, N1=4, N2=4 and N3=2. In the multi-cell and multi-TTI scheduling DCI, the C-DAI increases by one 1, then the bits size for this DAI counting is 10 bits, and the bits order is only determined by cell index in the multi-cell scheduling, that is from CC0 to CC3. If multi-TTI scheduling on one cell is configured, then the bits order is determined based on SLIV order for the cell. If only one TB for each PDSCH and ACK is feedback, then the bits order for FIG. 3 is "1110011111." Here, the first "1" from the left (from the most significant bit) corresponds to CC0, the second and third "1" from the left correspond to CC1, the fifth "1" from the right (from the least significant bit) corresponds to CC2, and the first to fourth "1" from the right correspond to CC3.

In this way, multi-cell scheduling and multi-TTI scheduling can be performed and/or configured together, reducing control overhead. HARQ-ACK feedback can be also constructed without ambiguity as one sub-codebook based on some embodiments of the disclosed technology. The DCI size can be reduced by a shared indication for the HARQ-ACK related fields, which make the multi-cell scheduling combined with multi-TTI scheduling more feasible.

Embodiment 2

In the current standard, there are Type 1 codebook and Type 2 codebook which can be configured by higher layer signaling. For Type 1 codebook, since it has no relation with the dynamic scheduling DCI for each PDSCH, then the Type 1 codebook is the same as a legacy codebook if multi-cell scheduling is introduced.

For Type 2 codebook, considering the multi-cell scheduling DCI design may have a separate or shared indication for each field. (1) If all the fields related to HARQ-ACK feedback are separately indicated, for example, C/T-DAI is separately indicated, optionally also separate indication for K1 and PRI, then the type 2 codebook construction is the same as a legacy codebook construction. (2) If C/T-DAI is shared indicated, the codebook for multi-cell PDSCH can be constructed as another sub-codebook similar to multi-PDSCH on one cell, where the C-DAI/T-DAI is counted per DCI, and HARQ-ACK for multi-PDSCH are in a single PUCCH, the indication of k1 is shared and based on the last PDSCH.

The disclosed technology can be implemented in some embodiments to determine how to handle with multi-cell scheduling together in a case that multi-PDSCH on one cell is configured.

In some embodiments, the disclosed technology can be implemented to determine the bit size and order of codebook when multi-PDSCH (multi-TTI) on one cell and multi-cell scheduling are both configured.

In the case of (1), the cell configured with multi-TTI scheduling can support multi-cell scheduling, because the scheduling information of each cell is indicated separately. Therefore, another sub-codebook for the multi-TTI PDSCH is constructed, and that sub-codebook is the same as a legacy codebook.

In the case of (2), C/T-DAI is separated indicated for multi-cell and multi-TTI scheduling and shared indicated within multi-cell scheduling or multi-TTI scheduling, two sub-codebooks are constructed. The bit size and order of the sub-codebooks are determined as will be discussed below.

In some implementations of the disclosed technology, HARQ-ACK bits size for each DAI can be determined as follows: multi-TTI scheduling is the same as a legacy scheme, multi-cell scheduling also includes the cell configured with multi-TTI scheduling for the only case of single PDSCH. In an example where the maximum configured number of cell number (N1), the bits size for each DAI for the multi-cell scheduling is N1 bits, the maximum configured number of PDSCHs is N2 for multi-PDSCH DCI across serving cells (N3), the bits size for each DAI for multi-TTI scheduling is N2*N3 bits. Here, only one TB is assumed for each PDSCH. If two codewords or CBG configured/scheduled, then multi bits for each cell accordingly.

In an example where multi-cell scheduling with configured maximum cells number is N1=4, the maximum configured number of PDSCHs are N2=4 for one cell in N1 cells and N2=2 for one cell in N1 cells, that is N2=4 for multi-PDSCH DCI across N3=2 cells. The bits size for each DAI for multi-cell scheduling is 4 bits, the bits size for each DAI for multi-TTI scheduling is 4*2=8 bits.

In some implementations of the disclosed technology, HARQ-ACK bits order for the two sub-CB can be determined as follows:

Method 1: bits order is for the sub-CB of the multi-cell scheduling first (with single PDSCH on each cell) by cell index, then for the sub-CB of the multi-TTI PDSCH by cell index and SLIV order for each cell.

Referring to FIG. 3, for example, the maximum cell number for the multi-cell scheduling is configured as 4 cells, where cell #1 is configured with maximum 2 PDSCHs for the multi-TTI scheduling and cell #3 is configured with maximum 4 PDSCHs for the multi-TTI scheduling. In this case, N1=4, N2=4 and N3=2. In the multi-cell and multi-TTI scheduling DCI, C/T-DAI is separately indicated for multi-cell and multi-TTI scheduling and the indication of C/T-DAI is shared within multi-cell scheduling or multi-TTI scheduling, the C-DAI for multi-cell scheduling increases by one 1, then the bits size for this DAI counting is 4 bits, and the bits order is for CC0 to CC3. The C-DAI for multi-TTI scheduling increases by one 1, then for the multi-TTI scheduling in the multi-cell scheduling is for CC1 and CC3, which is 8 bits. If only one TB for each PDSCH and ACK is feedback, then the bits order for the first sub-CB is "1010," and the second sub-CB is "11001111" in FIG. 3. Here, the first "1" from the left (from the most significant bit) of the first sub-CB corresponds to CC0, the third "1" from the left of the first sub-CB corresponds to CC2, the first and second "1" from the left (from the most significant bit) of the second sub-CB correspond to CC1, and the first to fourth "1" from the right (from the least significant bit) of the second sub-CB correspond to CC3.

Figure 4:
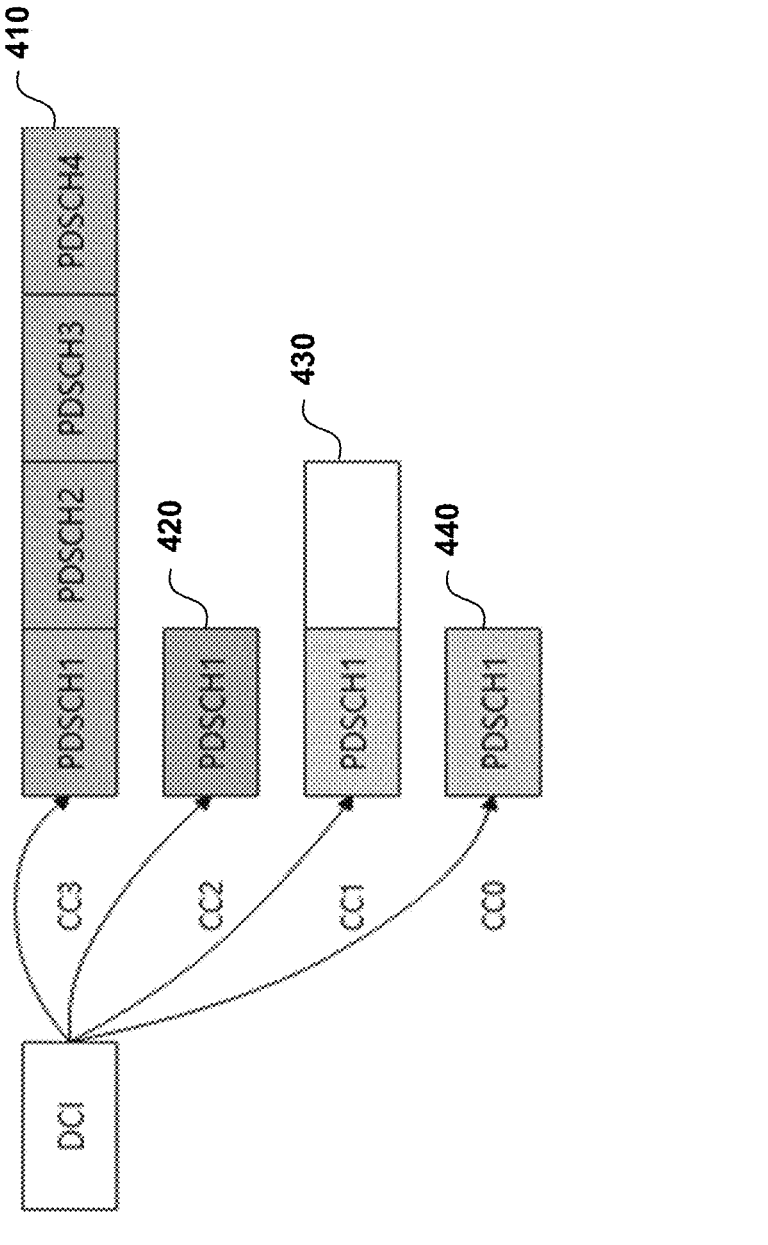
FIG. 4 shows another example of multi-cell scheduling based on some example embodiments of the disclosed technology.

FIG. 4 shows another example of multi-cell scheduling based on some example embodiments of the disclosed technology. FIG. 4 shows four cells 410, 420, 430, 440 (CC0, CC1, CC2, CC3) as an example.

Referring to FIG. 4, for example, the maximum cell number for the multi-cell scheduling is configured as 4 cells, where cell #1 is configured with maximum 2 PDSCHs for the multi-TTI scheduling and cell #3 is configured with maximum 4 PDSCHs for the multi-TTI scheduling. In this case, N1=4, N2=4 and N3=2. In the multi-cell and multi-TTI scheduling DCI, C/T-DAI is separately indicated for multi-cell and multi-TTI scheduling, and the indication of C/T-DAI is shared within multi-cell scheduling or multi-TTI scheduling, the C-DAI for multi-cell scheduling increases by one 1, then the bits size for this DAI counting is 4 bits, and the bits order is for CC0 to CC3. The C-DAI for multi-TTI scheduling increases by one 1, then for the multi-TTI scheduling in the multi-cell scheduling is for CC1 and CC3, which is 8 bits. Here, the actual scheduled PDSCH on cell #1 is one. If only one TB for each PDSCH and ACK is feedback, then the bits order for the first sub-CB is "1010," and the second sub-CB is "10001111" in FIG. 4, because the DAI for multi-TTI scheduling and the DAI for multi-cell scheduling are both in the single DCI. Then the HARQ-ACK for the actual scheduled single PDSCH cannot be put into the sub-CB for the multi-cell scheduling. Here, the first "1" from the left (from the most significant bit) of the first sub-CB corresponds to CC0, the third "1" from the left of the first sub-CB corresponds to CC2, the first "1" from the left (from the most significant bit) of the second sub-CB corresponds to CC1, and the first to fourth "1" from the right (from the least significant bit) of the second sub-CB correspond to CC3.

Optionally, HARQ-ACK for the actual scheduled single PDSCH can be also put in the first sub-CB, that is the bits order for the first sub-CB is "1110." Here, the first "1" from the left (from the most significant bit) of the first sub-CB corresponds to CC0, the second "1" from the left of the first sub-CB corresponds to CC1, and the third "1" from the left of the first sub-CB corresponds to CC2.

Optionally, HARQ-ACK for the actual scheduled single PDSCH can be also put in the first sub-CB, and the second sub-CB can only include the actual multi-TTI scheduling, that is the bits order for the first sub-CB is "1110" and the bits order for the second sub-CB is "1111." Here, the first "1" from the left (from the most significant bit) of the first sub-CB corresponds to CC0, the second "1" from the left of the first sub-CB corresponds to CC1, the third "1" from the left of the first sub-CB corresponds to CC2, and the first to fourth "1" of the second sub-CB correspond to CC3.

Method 2: bits order is for the sub-CB of the multi-TTI PDSCH by cell index first and SLIV order for each cell, and then for the sub-CB of the multi-cell scheduling (with single PDSCH on each cell) by cell index.

Referring to FIG. 3, for example, the maximum cell number for the multi-cell scheduling is configured as 4 cells, where cell #1 is configured with maximum 2 PDSCHs for the multi-TTI scheduling and cell #3 is configured with maximum 4 PDSCHs for the multi-TTI scheduling. In this case, N1=4, N2=4 and N3=2. In the multi-cell and multi-TTI scheduling DCI, C/T-DAI is separately indicated for multi-cell and multi-TTI scheduling, and the indication of C/T-DAI is shared within multi-cell scheduling or multi-TTI scheduling, the C-DAI for multi-TTI scheduling increases by one 1, then for the multi-TTI scheduling in the multi-cell scheduling is for CC1 and CC3, which is 8 bits. The C-DAI for multi-cell scheduling increases by one 1, then the bits size for this DAI counting is 4 bits, and the bits order is for CC0 to CC3. If only one TB for each PDSCH and ACK is feedback, then the bits order for the first sub-CB is "11001111," and the second sub-CB is "1010" in FIG. 3. Here, the first and second "1" from the left (from the most significant bit) of the first sub-CB correspond to CC1, the first to fourth "1" from the right (from the least significant bit) of the first sub-CB correspond to CC3, the first "1" from the left (from the most significant bit) of the second sub-CB correspond to CC0, and the third "1" from the left of the second sub-CB correspond to CC2.

Referring to FIG. 4, for example, the maximum cell number for the multi-cell scheduling is configured as 4 cells, wherein cell #1 is configured with maximum 2 PDSCHs for the multi-TTI scheduling and cell #3 is configured with maximum 4 PDSCHs for the multi-TTI scheduling. In this case, N1=4, N2=4 and N3=2. In the multi-cell and multi-TTI scheduling DCI, C/T-DAI is separately indicated for multi-cell and multi-TTI scheduling, and the indication of C/T-DAI is shared within multi-cell scheduling or multi-TTI scheduling, the C-DAI for multi-TTI scheduling increases by one 1, then for the multi-TTI scheduling in the multi-cell scheduling is for CC1 and CC3, which is 8 bits. The C-DAI for multi-cell scheduling increases by one 1, then the bits size for this DAI counting is 4 bits, and the bits order is for CC0 to CC3. Here, the actual scheduled PDSCH on cell #1 is one. If only one TB for each PDSCH and ACK is feedback, then the bits order for the first sub-CB is "10001111," and the second sub-CB is "1010" in FIG. 4, because the DAI for multi-TTI scheduling and the DAI for multi-cell scheduling are both in the single DCI. Then the HARQ-ACK for the actual scheduled single PDSCH cannot be put into the sub-CB for the multi-cell scheduling. Here, the first "1" from the left (from the most significant bit) of the first sub-CB corresponds to CC1, the first to fourth "1" from the right (from the least significant bit) of the first sub-CB correspond to CC3, the first "1" from the left (from the most significant bit) of the second sub-CB corresponds to CC0, and the third "1" from the left of the second sub-CB correspond to CC2.

Optionally, HARQ-ACK for the actual scheduled single PDSCH can be also put in the second sub-CB, that is the bits order for the second sub-CB is "1110." Here, the first "1" from the left (from the most significant bit) of the second sub-CB corresponds to CC0, the second "1" from the left of the second sub-CB corresponds to CC1, and the third "1" from the left of the second sub-CB corresponds to CC2.

Optionally, HARQ-ACK for the actual scheduled single PDSCH can be also put in the second sub-CB, and the first sub-CB can only include the actual multi-TTI scheduling, that is the bits order for the first sub-CB is "1111" and the bits order for the second sub-CB is "1110." Here, the first to fourth "1" of the first sub-CB correspond to CC3, the first "1" from the left (from the most significant bit) of the second sub-CB corresponds to CC0, the second "1" from the left of the second sub-CB corresponds to CC1, and the third "1" of the second sub-CB correspond to CC2.

In this way, multi-cell scheduling and multi-TTI scheduling can be performed and/or configured together, reducing control overhead. HARQ-ACK feedback can be also constructed without ambiguity as one sub-codebook by the embodiment. The DCI size can be reduced by shared indication for the HARQ-ACK related fields which make the multi-cell scheduling combined with multi-TTI scheduling more feasible.

Embodiment 3

In the current standard, multi-PDSCH (multi-TTI) scheduling can be configured for a serving cell. When multi-cell PUSCH/PDSCH scheduling with a single scheduling DCI is introduced, since multi-TTI scheduling on one cell is also for control overhead reduction, if multi-cell scheduling and multi-TTI scheduling can be applied together, some additional restrictions should be determined.

When multi-PDSCH on one cell is configured, and multi-cell scheduling is also configured for the same UE. The restriction on the maximum number of scheduled PDSCH in a case both multi-TTI and multi-cell scheduling are configured is determined by one of the following methods. This can be applied to PUSCH or can be applied to PDSCH and PUSCH.

Method 1: the maximum number of scheduled PDSCH is determined by the maximum number of multi-cell scheduling and the maximum number of multi-TTI scheduling. In some implementations, the maximum number of scheduled PDSCH is determined by multiplying a maximum number of configured cells for the multi-cell scheduling or a number of cells configured with multi-TTI scheduling by a maximum number of configured PDSCHs for the multi-TTI scheduling across cells configured with multi-TTI scheduling within the multi-cell scheduling.

9

10

For example, if the maximum number of multi-cell PDSCH scheduling is 8, and the maximum number of multi-TTI PDSCH scheduling is 8 across 4 cells, then the maximum number of scheduled PDSCH in case both multi-TTI and multi-cell scheduling are configured is 8*8=64, or 8*4=32.

Method 2: the maximum number of scheduled PDSCH is determined by the maximum number of multi-cell scheduling.

For example, if the maximum number of multi-cell PDSCH scheduling is 4, and the maximum number of multi-TTI PDSCH scheduling is 8, then the maximum number of scheduled PDSCH in a case both multi-TTI and multi-cell scheduling are configured is 4. For example, CC0 to CC3 can be scheduled by one DCI for multi-cell scheduling, and CC1 is also configured with multi-TTI scheduling, then one actual scheduling is single PDSCH on CC0, 2 PDSCHs used multi-TTI scheduling on CC1, and single PDSCH on CC2, the total PDSCH is 4.

Method 3: the maximum number of scheduled PDSCH is determined by the maximum number of multi-TTI scheduling.

For example, if the maximum number of multi-cell PDSCH scheduling is 4, and the maximum number of multi-TTI PDSCH scheduling is 8, then the maximum number of scheduled PDSCH in a case both multi-TTI and multi-cell scheduling are configured is 8. For example, CC0 to CC3 can be scheduled by one DCI for multi-cell scheduling, and CC0 to CC3 are also configured with multi-TTI scheduling, then one actual scheduling is 4 PDSCHs using multi-TTI scheduling on CC0, 2 PDSCHs using multi-TTI scheduling on CC1, single PDSCH on CC2, and single PDSCH on CC3, the total PDSCH is 8.

Method 4: the maximum number of scheduled PDSCH is determined by the maximum of {maximum number of multi-cell scheduling, maximum number of multi-TTI scheduling}.

For example, if the maximum number of multi-cell PDSCH scheduling is 4, and the maximum number of multi-TTI PDSCH scheduling is 8, then the maximum number of scheduled PDSCH in a case both multi-TTI and multi-cell scheduling are configured is 8. For example, CC0 to CC3 can be scheduled by one DCI for multi-cell scheduling, and CC0 to CC3 are also configured with multi-TTI scheduling, then one actual scheduling is 4 PDSCHs used multi-TTI scheduling on CC0, 2 PDSCHs used multi-TTI scheduling on CC1, single PDSCH on CC2, and single PDSCH on CC3, the total PDSCH is 8.

Method 5: the maximum number of scheduled PDSCH is determined by higher layer signaling or determined based on the Methods 1-4 combined with higher layer signaling to scale the result of Methods 1-4.

For example, if the maximum number of multi-cell PDSCH scheduling is 4, and the maximum number of multi-TTI PDSCH scheduling is 8, then the maximum number of scheduled PDSCH in a case both multi-TTI and multi-cell scheduling are configured is N, wherein N is configured by higher layer signaling (e.g., N=16).

For example, based on Method 1 combined with scaling factor, if the maximum number of multi-cell PDSCH scheduling is 4, and the maximum number of multi-TTI PDSCH scheduling is 8, then the maximum number of scheduled PDSCH in a case both multi-TTI and multi-cell scheduling are configured is 4*8*A, where A is a scaling factor configured by higher layer signaling (e.g., A=0.5, the result is 16).

For example, based on Method 4 combined with scaling factor, if the maximum number of multi-cell PDSCH scheduling is 4, and the maximum number of multi-TTI PDSCH scheduling is 8, then the maximum number of scheduled PDSCH in case both multi-TTI and multi-cell scheduling are configured is 8*A, where A is a scaling factor configured by higher layer signaling (e.g., A=2, the result is 16).

In this way, multi-cell scheduling and multi-TTI scheduling can be performed and/or configured together, reducing control overhead. The maximum number of PDSCHs or PUSCHs are restricted by some embodiments, which make the multi-cell scheduling combined with multi-TTI scheduling more feasible.

The disclosed technology can be implemented in some embodiments to handle multi-cell scheduling when multi-PDSCH on one cell is configured.

In some embodiments of the disclosed technology, the indication of C/T-DAI is shared, both multi-cell and multi-TTI scheduling are constructed as in one sub-codebook. The bit size and order of the sub-codebook are determined as discussed below.

HARQ-ACK bits size for each DAI: Assume the maximum configured number of cell number (N1), the maximum configured number of PDSCHs (N2) for multi-PDSCH DCI across serving cells (N3), then the bits size for each DAI is N1+N2*N3−N3.

HARQ-ACK bits order for the sub-CB: In Method 1, bits order for the sub-CB is for the multi-cell with single PDSCH by cell index first, then for the multi-TTI PDSCH by cell index and SLIV order for each cell. In Method 2, bits order for the sub-CB is for the multi-TTI PDSCH by cell index first and SLIV order for each cell, then for the multi-cell with single PDSCH by cell index. In Method 3, bits order for the sub-CB is determined only by cell index and SLIV order for each cell if any.

In some embodiments of the disclosed technology, C/T-DAI is separately indicated for multi-cell and multi-TTI scheduling and shared indicated within multi-cell scheduling or multi-TTI scheduling, two sub-codebooks are constructed. The bit size and order of the sub-codebooks are determined as discussed below.

HARQ-ACK bits size for each DAI: multi-cell scheduling also includes the cell configured with multi-TTI scheduling for the only case of single PDSCH. Assume the maximum configured number of cell number (N1), then the bits size for each DAI for the multi-cell scheduling is N1 bits. The maximum configured number of PDSCHs (N2) for multi-PDSCH DCI across serving cells (N3), then the bits size for each DAI for multi-TTI scheduling is N2*N3 bits.

HARQ-ACK bits order for the two sub-CB: In Method 1, bits order is for the sub-CB of the multi-cell scheduling first (with single PDSCH on each cell) by cell index, then for the sub-CB of the multi-TTI PDSCH by cell index and SLIV order for each cell. In Method 2, bits order is for the sub-CB of the multi-TTI PDSCH by cell index first and SLIV order for each cell, then for the sub-CB of the multi-cell scheduling (with single PDSCH on each cell) by cell index.

In some embodiments of the disclosed technology, the restriction on the maximum number of scheduled PDSCH in a case both multi-TTI and multi-cell scheduling are configured is determined by one of the following methods. In Method 1, the maximum number of scheduled PDSCH is determined by the maximum number of multi-cell scheduling and the maximum number of multi-TTI scheduling. In Method 2, the maximum number of scheduled PDSCH is determined by the maximum number of multi-cell scheduling. In Method 3, the maximum number of scheduled PDSCH is determined by the maximum number of multi-TTI scheduling. In Method 4, the maximum number of scheduled PDSCH is determined by the maximum of {maximum number of multi-cell scheduling, maximum number of multi-TTI scheduling}. In Method 5, the maximum number of scheduled PDSCH is determined by higher layer signaling, or based on Methods 1-4 combined with higher layer signaling to scale the result of Methods 1-4.

FIG. 5 shows an example of a process for wireless communication based on some example embodiments of the disclosed technology.

In some implementations, the process 500 for wireless communication may include, at 510, receiving, by a wireless device, a first configuration of multiple traffic channels on multiple cells scheduled by a downlink control information (DCI) and a second configuration of multiple traffic channels on one cell scheduled by the DCI, and at 520 receiving the multiple traffic channels scheduled by the DCI.

In one example, the DCI include a counter downlink assignment index (C-DAI) that increases by one per DCI for all scheduled traffic channels. In one example, the DCI includes a first counter downlink assignment index (C-DAI) that increases by one per DCI for the scheduled single traffic channel on one cell in a multi-cell scheduling and a second C-DAI that increases by one per DCI for the scheduled multiple traffic channels on one cell across cells configured with multi-TTI (transmission time interval) scheduling in the same multi-cell scheduling. In one example, the multiple traffic channels include PDSCH, and a maximum number of PDSCHs is determined based on at least one of: a maximum number of configured cells for a multi-cell scheduling; a maximum number of configured PDSCHs for a multi-TTI scheduling across cells configured with multi-TTI scheduling within the multi-cell scheduling; a number of cells configured with multi-TTI scheduling; or a higher layer signaling configuration.

Figure 6:
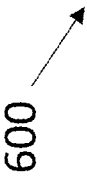
FIG. 6 shows another example of a process for wireless communication based on some example embodiments of the disclosed technology.

FIG. 6 shows another example of a process for wireless communication based on some example embodiments of the disclosed technology.

In some implementations, the process 600 for wireless communication may include, at 610, configuring, by a network device, multiple traffic channels on one or more cells, the multiple traffic channels on multiple cells being scheduled by a downlink control information (DCI), the multiple traffic channels on one cell of the multiple cells being scheduled by the DCI, and at 620 transmitting the multiple traffic channels scheduled by the DCI In one example, the DCI includes a counter downlink assignment index (C-DAI) that increases by one per DCI for all scheduled traffic channels. In one example, the DCI includes a first counter downlink assignment index (C-DAI) that increases by one per DCI for the scheduled single traffic channel on one cell in a multi-cell scheduling and a second C-DAI that increases by one per DCI for the scheduled multiple traffic channels on one cell in the same multi-cell scheduling. In one example, the multiple traffic channels include PDSCH, and a maximum number of PDSCHs is determined based on at least one of: a maximum number of configured cells for a multi-cell scheduling; a maximum number of configured PDSCHs for a multi-TTI scheduling across cells configured with multi-TTI scheduling within the multi-cell scheduling; a number of cells configured with multi-TTI scheduling; or a higher layer signaling configuration.

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of wireless communication, comprising: receiving, by a wireless device, a first configuration of multiple traffic channels on multiple cells scheduled by a downlink control information (DCI) and a second configuration of multiple traffic channels on one cell scheduled by the DCI; and receiving the multiple traffic channels scheduled by the DCI. In some implementations, a single traffic channel of the multiple traffic channels is scheduled on one of the multiple cells.

Clause 2. The method of clause 1, wherein the DCI include a counter downlink assignment index (C-DAI) that increases by one per DCI for all scheduled traffic channels.

Clause 3. The method of clause 2, wherein a size of hybrid automatic repeat request acknowledgment (HARQ-ACK) bits for each C-DAI in a codebook is determined based on a maximum number of configured cells and a maximum number of configured physical downlink shared channels (PDSCHs), wherein the maximum number of configured cells corresponds to a multi-cell scheduling for scheduling multiple traffic channels on multiple cells scheduled by the DCI, and wherein the maximum number of configured PDSCHs corresponds to a multi-transmission time interval (TTI) scheduling for scheduling multiple traffic channels on one cell scheduled by the DCI across cells configured with multi-TTI scheduling.

Clause 4. The method of clause 2, wherein HARQ-ACK bits for each C-DAI in a codebook includes a plurality of bits arranged in the order of: (1) one or more bits corresponding to a single PDSCH scheduling on one cell in a multi-cell scheduling according to a cell index; (2) one or more bits corresponding to a multi-TTI scheduling according to the cell index and a start and length indicator (SLIV) for a time domain order for each cell.

Clause 5. The method of clause 2, wherein HARQ-ACK bits for each C-DAI in a codebook includes a plurality of bits arranged in the order of: (1) one or more bits corresponding to a multi-TTI scheduling according to a cell index and a start and length indicator (SLIV) for a time domain order for each cell; (2) one or more bits corresponding to a single PDSCH scheduling on one cell in a multi-cell scheduling according to the cell index.

Clause 6. The method of clause 2, wherein HARQ-ACK bits for each C-DAI in a codebook includes a plurality of bits arranged according to a cell index.

Clause 7. The method of clause 1, wherein the DCI includes a first counter downlink assignment index (C-DAI) that increases by one per DCI for the scheduled single traffic channel on one cell in a multi-cell scheduling and a second C-DAI that increases by one per DCI for the scheduled multiple traffic channels on one cell across cells configured with multi-TTI scheduling in the same multi-cell scheduling.

Clause 8. The method of clause 7, wherein a size of HARQ-ACK bits for each C-DAI in each sub-codebook is determined based on a maximum number of configured cells or a maximum number of configured physical downlink shared channels (PDSCHs), wherein the maximum number of configured cells corresponds to a multi-cell scheduling for scheduling multiple traffic channels on multiple cells scheduled by the DCI, or wherein the maximum number of configured PDSCHs corresponds to a multi-TTI scheduling for scheduling multiple traffic channels on one cell scheduled by the DCI across cells configured with multi-TTI scheduling.

Clause 9. The method of clause 7, wherein HARQ-ACK bits for the first C-DAI in a first sub-codebook includes a plurality of bits arranged according to a cell index or corresponding to a single PDSCH scheduling on one cell in a multi-cell scheduling according to the cell index, and wherein HARQ-ACK bits for the second C-DAI in a second sub-codebook includes a plurality of bits arranged in the order of one or more bits corresponding to a multi-TTI scheduling according to the cell index and a start and length indicator (SLIV) for a time domain order for each cell.

Clause 10. The method of clause 7, wherein HARQ-ACK bits for the second C-DAI in a first sub-codebook includes a plurality of bits arranged in the order of one or more bits corresponding to a multi-TTI scheduling according to a cell index and a start and length indicator (SLIV) for a time domain order for each cell, and wherein HARQ-ACK bits for the first C-DAI in a second sub-codebook includes one or more bits arranged according to a cell index or corresponding to a single PDSCH scheduling on one cell in a multi-cell scheduling according to the cell index.

Clause 11. The method of clause 1, wherein the multiple traffic channels include PDSCH, and wherein a maximum number of PDSCHs is determined based on at least one of: a maximum number of configured cells for a multi-cell scheduling; a maximum number of configured PDSCHs for a multi-TTI scheduling across cells configured with multi-TTI scheduling within the multi-cell scheduling; a number of cells configured with multi-TTI scheduling; and a higher layer signaling configuration.

Clause 12. The method of clause 11, wherein a maximum number of scheduled PDSCHs is determined by multiplying a maximum number of configured cells for the multi-cell scheduling or a number of cells configured with multi-TTI scheduling by a maximum number of configured PDSCHs for the multi-TTI scheduling across cells configured with multi-TTI scheduling within the multi-cell scheduling.

Clause 13. The method of clause 11, wherein a maximum number of scheduled PDSCHs is the maximum number of configured cells for the multi-cell scheduling.

Clause 14. The method of clause 11, wherein a maximum number of scheduled PDSCHs is the maximum number of configured PDSCHs for the multi-TTI scheduling across cells configured with multi-TTI scheduling within the multi-cell scheduling.

Clause 15. The method of clause 11, wherein a maximum number of scheduled PDSCHs is determined based on a greater value between the maximum number of configured cells for the multi-cell scheduling and the maximum number of configured PDSCHs for the multi-TTI scheduling across cells configured with multi-TTI scheduling within the multi-cell scheduling.

Clause 16. The method of any of clauses 12-15, wherein the maximum number of scheduled PDSCHs is configured by a higher layer signaling, or is configured by a higher layer signaling to scale the determined maximum number of scheduled PDSCHs.

Clause 17. A method of wireless communication, comprising: configuring, by a network device, multiple traffic channels on one or more cells, the multiple traffic channels on multiple cells being scheduled by a downlink control information (DCI), the multiple traffic channels on one cell of the multiple cells being scheduled by the DCI; and transmitting the multiple traffic channels scheduled by the DCI.

Clause 18. The method of clause 17, wherein the DCI includes a counter downlink assignment index (C-DAI) that increases by one per DCI for all scheduled traffic channels.

Clause 19. The method of clause 17, wherein the DCI includes a first counter downlink assignment index (C-DAI) that increases by one per DCI for the scheduled single traffic channel on one cell in a multi-cell scheduling and a second C-DAI that increases by one per DCI for the scheduled multiple traffic channels on one cell in the same multi-cell scheduling.

Clause 20. The method of clause 17, wherein the multiple traffic channels include PDSCH, and wherein a maximum number of PDSCHs is determined based on at least one of: a maximum number of configured cells for a multi-cell scheduling; a maximum number of configured PDSCHs for a multi-TTI scheduling across cells configured with multi-TTI scheduling within the multi-cell scheduling; a number of cells configured with multi-TTI scheduling; and a higher layer signaling configuration.

Clause 21. An apparatus for wireless communication comprising a processor that is configured to carry out the method of any of clauses 1 to 20.

Clause 22. A non-transitory computer readable medium having code stored thereon, the code when executed by a processor, causing the processor to implement a method recited in any of clauses 1 to 20.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

receiving, by a wireless device, a first configuration of multiple traffic channels on multiple cells scheduled by a downlink control information (DCI) and a second configuration of multiple traffic channels on one cell scheduled by the DCI; and receiving the multiple traffic channels on multiple cells or the multiple traffic channels on one cell scheduled by the DCI, wherein the DCI include a counter downlink assignment index (C-DAI), wherein a bit size of hybrid automatic repeat request acknowledgment (HARQ-ACK) bits for each C-DAI in a codebook is determined based on a maximum number of configured cells and a maximum number of configured physical downlink shared channels (PDSCHs), and a bit order of the HARQ-ACK bits for each C-DAI in a codebook is determined based on whether a corresponding bit of the HARQ-ACK bits relates to a single PDSCH scheduling on one cell in a multi-cell scheduling according to a cell index or a multi-transmission time interval (TTI) scheduling according to the cell index and a start and length indicator (SLIV) for a time domain order for each cell.

2. The method of claim 1, wherein the C-DAI increases by one per DCI for all scheduled traffic channels.

3. The method of claim 2, wherein the maximum number of configured cells corresponds to a multi-cell scheduling for scheduling multiple traffic channels on multiple cells scheduled by the DCI, and wherein the maximum number of configured PDSCHs corresponds to a multi-transmission time interval (TTI) scheduling for scheduling multiple traffic channels on one cell scheduled by the DCI across cells configured with multi-TTI scheduling.

4. The method of claim 2, wherein the HARQ-ACK bits for each C-DAI in a codebook includes a plurality of bits arranged in the order of: (1) one or more bits corresponding to a single PDSCH scheduling on one cell in a multi-cell scheduling according to a cell index; (2) one or more bits corresponding to a multi-TTI scheduling according to the cell index and a start and length indicator (SLIV) for a time domain order for each cell.

5. The method of claim 2, wherein the HARQ-ACK bits for each C-DAI in a codebook includes a plurality of bits arranged in the order of: (1) one or more bits corresponding to a multi-TTI scheduling according to a cell index and a start and length indicator (SLIV) for a time domain order for each cell; (2) one or more bits corresponding to a single PDSCH scheduling on one cell in a multi-cell scheduling according to the cell index.

6. The method of claim 2, wherein the HARQ-ACK bits for each C-DAI in a codebook includes a plurality of bits arranged according to a cell index.

7. The method of claim 1, wherein the C-DAI includes a first counter downlink assignment index (C-DAI) that increases by one per DCI for a scheduled single traffic channel on one cell in a multi-cell scheduling and a second C-DAI that increases by one per DCI for a scheduled multiple traffic channels on one cell across cells configured with multi-TTI scheduling in a same multi-cell scheduling.

8. The method of claim 1, wherein the multiple traffic channels include PDSCH, and wherein the maximum number of PDSCHs is determined based on at least one of:

a maximum number of configured cells for a multi-cell scheduling;

a maximum number of configured PDSCHs for a multi-TTI scheduling across cells configured with multi-TTI scheduling within the multi-cell scheduling;

a number of cells configured with multi-TTI scheduling; and a higher layer signaling configuration.

9. The method of claim 8, wherein a maximum number of scheduled PDSCHs is determined by multiplying a maximum number of configured cells for the multi-cell scheduling or a number of cells configured with multi-TTI scheduling by a maximum number of configured PDSCHs for the multi-TTI scheduling across cells configured with multi-TTI scheduling within the multi-cell scheduling.

10. The method of claim 9, wherein the maximum number of scheduled PDSCHs is configured by a higher layer signaling, or is configured by a higher layer signaling to scale the determined maximum number of scheduled PDSCHs.

11. The method of claim 8, wherein a maximum number of scheduled PDSCHs is the maximum number of configured cells for the multi-cell scheduling.

12. The method of claim 8, wherein a maximum number of scheduled PDSCHs is the maximum number of configured PDSCHs for the multi-TTI scheduling across cells configured with multi-TTI scheduling within the multi-cell scheduling.

13. The method of claim 8, wherein a maximum number of scheduled PDSCHs is determined based on a greater value between the maximum number of configured cells for the multi-cell scheduling and the maximum number of configured PDSCHs for the multi-TTI scheduling across cells configured with multi-TTI scheduling within the multi-cell scheduling.

14. An apparatus for wireless communication comprising at least one processor that is configured to cause the apparatus to carry out the method of claim 1.

15. A method of wireless communication, comprising:

receiving, by a wireless device, a first configuration of multiple traffic channels on multiple cells scheduled by a downlink control information (DCI) and a second configuration of multiple traffic channels on one cell scheduled by the DCI; and receiving the multiple traffic channels scheduled by the DCI, wherein the DCI includes a first counter downlink assignment index (C-DAI) that increases by one per DCI for a scheduled single traffic channel on one cell in a multi-cell scheduling and a second C-DAI that increases by one per DCI for a scheduled multiple traffic channels on one cell across cells configured with multi-TTI scheduling in a same multi-cell scheduling, wherein HARQ-ACK bits for the first C-DAI in a first sub-codebook includes a plurality of bits arranged according to a cell index or corresponding to a single PDSCH scheduling on one cell in a multi-cell scheduling according to the cell index, and wherein HARQ-ACK bits for the second C-DAI in a second sub-codebook includes a plurality of bits arranged in order of one or more bits corresponding to a multi-TTI scheduling according to the cell index and a start and length indicator (SLIV) for a time domain order for each cell.

16. A method of wireless communication, comprising:

receiving, by a wireless device, a first configuration of multiple traffic channels on multiple cells scheduled by a downlink control information (DCI) and a second configuration of multiple traffic channels on one cell scheduled by the DCI; and receiving the multiple traffic channels scheduled by the DCI, wherein the DCI includes a first counter downlink assignment index (C-DAI) that increases by one per DCI for a scheduled single traffic channel on one cell in a multi-cell scheduling and a second C-DAI that increases by one per DCI for a scheduled multiple traffic channels on one cell across cells configured with multi-TTI scheduling in a same multi-cell scheduling, wherein HARQ-ACK bits for the second C-DAI in a first sub-codebook includes a plurality of bits arranged in order of one or more bits corresponding to a multi-TTI scheduling according to a cell index and a start and length indicator (SLIV) for a time domain order for each cell, and wherein HARQ-ACK bits for the first C-DAI in a second sub-codebook includes one or more bits arranged according to a cell index or corresponding to a single PDSCH scheduling on one cell in a multi-cell scheduling according to the cell index.

17. A method of wireless communication, comprising:

configuring, by a network device, multiple traffic channels on one or more cells, the multiple traffic channels on multiple cells being scheduled by a downlink control information (DCI), the multiple traffic channels on one cell of the multiple cells being scheduled by the DCI; and transmitting the multiple traffic channels on multiple cells or the multiple traffic channels on one cell scheduled by the DCI, wherein the DCI include a counter downlink assignment index (C-DAI), wherein a bit size of hybrid automatic repeat request acknowledgment (HARQ-ACK) bits for each C-DAI in a codebook is determined based on a maximum number of configured cells and a maximum number of configured physical downlink shared channels (PDSCHs), and a bit order of the HARQ-ACK bits for each C-DAI in a codebook is determined based on whether a corresponding bit of the HARQ-ACK bits relates to a single PDSCH scheduling on one cell in a multi-cell scheduling according to a cell index or a multi-transmission time interval (TTI) scheduling according to the cell index and a start and length indicator (SLIV) for a time domain order for each cell.

18. The method of claim 17, wherein the C-DAI increases by one per DCI for all scheduled traffic channels.

19. The method of claim 17, wherein the C-DAI includes a first counter downlink assignment index (C-DAI) that increases by one per DCI for a scheduled single traffic channel on one cell in a multi-cell scheduling and a second C-DAI that increases by one per DCI for a scheduled multiple traffic channels on one cell in a same multi-cell scheduling.

20. The method of claim 17, wherein the multiple traffic channels include PDSCH, and wherein the maximum number of PDSCHs is determined based on at least one of:

a maximum number of configured cells for a multi-cell scheduling;

a maximum number of configured PDSCHs for a multi-TTI scheduling across cells configured with multi-TTI scheduling within the multi-cell scheduling;

a number of cells configured with multi-TTI scheduling; and a higher layer signaling configuration.

* * * * *